United States Patent [19]

Colbo, Jr.

[11] Patent Number: 5,579,795
[45] Date of Patent: Dec. 3, 1996

[54] GOLF CART SUN SHADE AND INCLEMENT WEATHER PROTECTION DEVICE

[76] Inventor: Kenneth G. Colbo, Jr., 2505 S. Russell, Missoula, Mont. 59801

[21] Appl. No.: 591,804

[22] Filed: Jan. 25, 1996

[51] Int. Cl.$^6$ .............................. E04H 15/04; B62B 3/00; F16M 13/00
[52] U.S. Cl. .................. 135/88.01; 280/645; 280/646; 280/DIG. 6; 135/96; 135/16; 135/88.03
[58] Field of Search ..................... 135/15.1, 16, 20.1, 135/88.01, 88.02, 88.03, 88.13, 88.15, 90, 96; 280/646, 645, 642, 647, DIG. 6; 297/184.11, 184.15, 184.17; 206/315.3, 315.4

[56] References Cited

U.S. PATENT DOCUMENTS

| | | |
|---|---|---|
| 3,531,136 | 9/1970 | Mobley . |
| 3,866,934 | 2/1975 | Braun ................... 135/16 X |
| 3,899,098 | 8/1975 | Hutchins . |
| 3,938,869 | 2/1976 | Josey . |
| 4,179,053 | 12/1979 | Figura ................... 135/96 X |
| 4,188,965 | 2/1980 | Morman ................... 135/16 |
| 4,334,692 | 6/1982 | Lynch . |
| 4,383,563 | 5/1983 | Kirchoff, Jr. . |
| 4,396,205 | 8/1983 | Rosén ................... 280/646 |
| 4,522,300 | 6/1985 | Hamblet . |
| 4,550,930 | 11/1985 | Proffit . |
| 4,699,164 | 10/1987 | Pilney et al. . |
| 4,788,996 | 12/1988 | Forshee . |
| 4,832,362 | 5/1989 | Chen . |
| 4,858,761 | 8/1989 | Fumia . |
| 4,887,786 | 12/1989 | Stokes . |
| 4,961,593 | 10/1990 | Sanders et al. . |
| 5,022,420 | 6/1991 | Brim ................... 135/88.01 |
| 5,024,458 | 6/1991 | Kazmark et al. ................... 280/645 |
| 5,048,856 | 9/1991 | Sanders et al. . |
| 5,074,576 | 12/1991 | Finlay . |
| 5,096,257 | 3/1992 | Clark ................... 135/96 X |
| 5,154,473 | 10/1992 | Joranco ................... 135/96 X |
| 5,203,363 | 4/1993 | Kidwell et al. ................... 135/96 X |
| 5,249,822 | 10/1993 | Luu . |
| 5,265,839 | 11/1993 | Buckley ................... 280/DIG. 6 |
| 5,267,750 | 12/1993 | Thompson . |
| 5,277,211 | 1/1994 | Hendershot . |
| 5,288,099 | 2/1994 | Wu . |
| 5,297,570 | 3/1994 | Conner . |
| 5,301,519 | 4/1994 | Howorka . |
| 5,431,364 | 7/1995 | Etter ................... 135/16 X |

*Primary Examiner*—Wynn E. Wood
*Attorney, Agent, or Firm*—John R. Flanagan

[57] ABSTRACT

A golf cart sun shade and inclement weather protection device includes a support frame adapted for attachment to a golf cart and being convertible between a retracted position and an extended position and an elongated shade adapted for attachment to the support frame and being convertible between a collapsed condition and a deployed condition. The shade in the collapsed condition is unattached and removed from the support frame and in the deployed condition is releasably attachable to and overlying the support frame with the support frame in the extended position. The support frame is secured to the golf cart and the golf club bag is placed within the support frame. The shade is attached to the support frame while the support frame is moved from the retracted position to the extended position. A securing arrangement secures the support frame in the extended position. Tie straps of the shade are used to pull the shade tight over the support frame and are fastened to the upper end or to the lower end of the support frame to secure the shade in the deployed condition.

23 Claims, 4 Drawing Sheets

GOLF CART SUN SHADE AND INCLEMENT WEATHER PROTECTION DEVICE

BACKGROUND OF THE INVENTION

1. Field of the Invention

The present invention generally relates to devices for attachment to golf carts which protect the golfer and the bag of golf clubs from the sun and inclement weather and, more particularly, is concerned with a golf cart sun shade and inclement weather protection device.

2. Description of the Prior Art

Golfers frequently experience exposure to the sun and inclement weather while out on the golf course. For this reason, many golfers carry an umbrella attached to their bag of clubs. Umbrellas of various sizes may be used by golfers in this way. Problems exist, however, with the use of common umbrellas for sun shade and/or protection from inclement weather on the golf course.

Most umbrellas are difficult to hold in strong winds generally associated with inclement weather. An umbrella must also be held by the golfer while walking the course and therefore eliminates the use of one hand. While the golfer is hitting the ball, the umbrella must either be held by another golfer, placed in the golfer's club bag, or set on the ground. These alternatives are generally not desirable as another golfer is often not available or nearby, umbrellas generally require too much space in the club bag and often will blow away if placed nearby on the ground. Furthermore, most commonly used umbrellas do not provide adequate cover for both the golfer and the club bag.

A variety of devices have therefore been developed over the years to address this need for protection from the sun and from inclement weather by the golfer on the golf course. Representative examples of these devices are disclosed in U.S. Pat. No. 4,334,692 to Lynch, U.S. Pat. No. 4,522,300 to Hamblet, U.S. Pat. No. 4,550,930 to Proffit, U.S. Pat. No. 4,699,164 to Pilney et al., U.S. Pat. No. 4,788,996 to Forshee, U.S. Pat. No. 4,832,362 to Chen, U.S. Pat. No. 4,858,761 to Fumia, U.S. Pat. No. 4,887,786 to Stokes, U.S. Pat. No. 5,277,211 to Hendershot and U.S. Pat. No. 5,297,570 to Conner.

A common element in most of these prior art devices is a support assembly for attachment to a motorized or pull golf cart for anchoring a conventional umbrella to provide cover for the golfer or the bag of clubs or both. While this may free both hands of the golfer and provide a place for the umbrella while the golfer hits the ball and eliminate the problem of the umbrella blowing away in the wind, these devices use conventional umbrellas which do not appear to provide adequate coverage for both the golfer and the club bag.

Consequently, a need still exists for a device which overcomes the aforementioned problems in the prior art by providing a comprehensive solution for protection of the golfer and the top of the golf club bag from the sun and inclement weather on the golf course without introducing any new problems in their place.

SUMMARY OF THE INVENTION

The present invention provides a golf cart sun shade and inclement weather protection device which is designed to satisfy the aforementioned need in the prior art. The device of the present invention provides a comprehensive solution for protection of both the golfer and the top of the golf club bag from the sun and inclement weather on the golf course. The device is usable with most existing golf carts, is simple and efficient to set up, and is compact in that it forms a single unit with the golf cart and the golf club bag.

Accordingly, the present invention is directed to a golf cart shade and inclement weather protection device which comprises: (a) a support frame adapted for removable attachment to a golf cart and being convertible between a retracted position and an extended position; and (b) an elongated shade adapted for attachment to the support frame and being convertible between a collapsed condition and a deployed condition, the shade in the collapsed condition being unattached and removed from the support frame and in the deployed condition being releasably attachable to and overlying the support frame with the support frame disposed in the extended position.

The support frame more particularly includes a lower base portion having a pair of longitudinal lower frame members and a pair of arcuate-shaped cross members spaced apart from one another along the lower frame members and rigidly interconnecting the longitudinal lower frame members for receiving a bag of golf clubs therebetween and being attachable to the golf cart, an upper extension portion having a pair of longitudinal lower frame extension members and a pair of longitudinal upper frame extension members pivotally connected to one another, and means for releasably securing the support frame in the extended position.

The upper extension portion is mounted at lower ends of the lower frame extension members to an upper end of the lower base portion for pivotal movement between the retracted position of the support frame in which the lower and upper frame extension members lie in a substantially folded position relative to one another alongside the lower base portion and the extended position of the support frame in which the lower and upper frame extension members of the upper extension portion extend away from one another into a substantially unfolded position away from the lower base portion.

The elongated shade more particularly includes a main cover having an upper portion and a lower portion releasably attachable at a lower end to the upper end of the lower base portion of the support frame when the shade is in the deployed condition and the support frame is in the extended position, a pair of opposite side covers attached to and extending along at least adjacent extents of opposite sides of the upper and lower portions of the main cover with the main cover and the opposite side covers being for overlying the support frame with the shade in the deployed condition and the support frame in the extended position, and a pair of substantially transverse rods with an upper rod being attached to and extending along the main cover at an upper end of the upper portion thereof between the opposite sides thereof with the shade in the deployed condition and being releasably attachable to upper ends of the pair of upper frame extension members of the upper extension portion of the support frame with the support frame in the extended position and a lower rod in substantially parallel relationship to the upper rod and being attached to and extending along the main cover of the shade at a location of merger between the upper and lower portions thereof and between the opposite sides thereof with the shade in the deployed condition and being seatable on the upper extension portion of the support frame with the support frame in the extended position.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figures 1, 2, 3, 4:
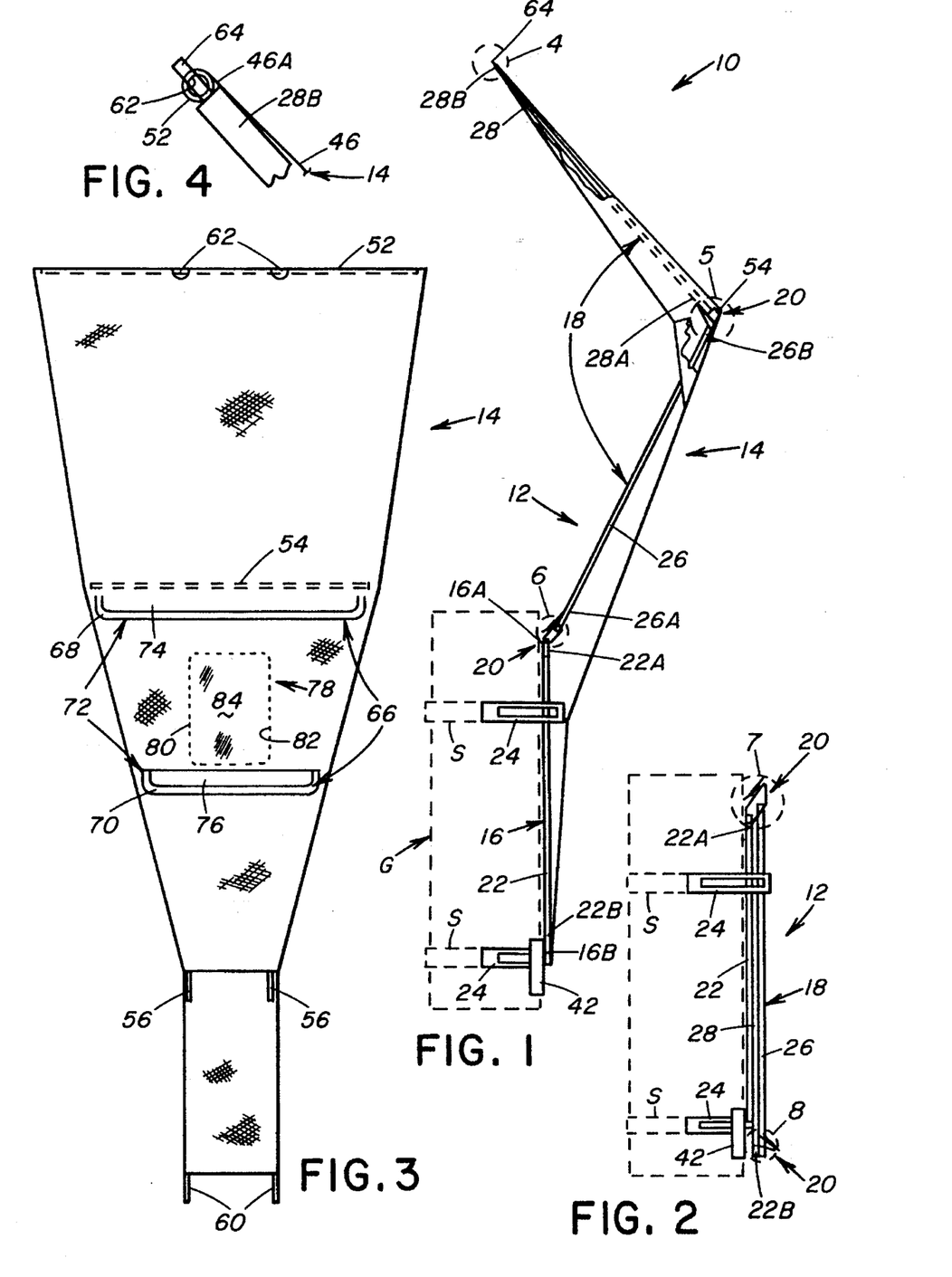
FIG. 1 is a side elevational view of the golf cart sun shade and inclement weather protection device of the present invention showing the location of a golf club bag and cart in phantom, the support frame in an extended position, and the elongated shade in a deployed condition.
FIG. 2 is a side elevational view of the device, showing the location of the golf club bag and cart in phantom and the support frame in a retracted position.
FIG. 3 is a plan view of the elongated shade in the deployed condition.
FIG. 4 is an enlarged detailed view of the area of the device enclosed by circle 4 of FIG. 1.
Figure 5:
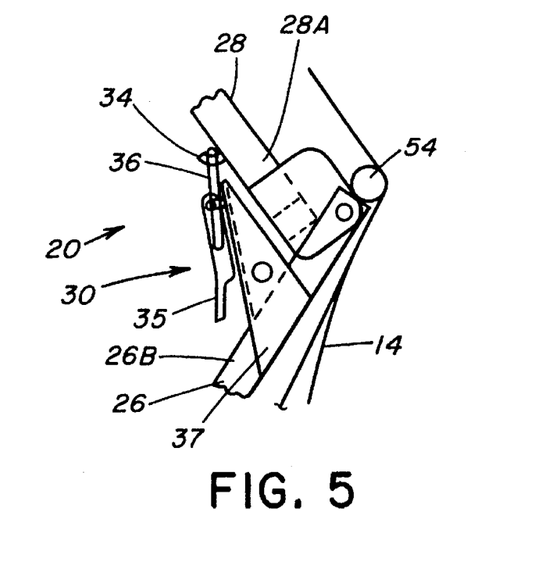
FIG. 5 is an enlarged detailed view of the area of the device enclosed by circle 5 of FIG. 1.
Figure 6:
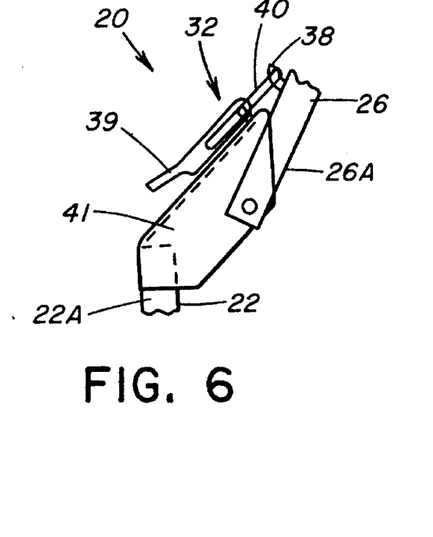
FIG. 6 is an enlarged detailed view of the area of the device enclosed by circle 6 of FIG. 1.
Figure 7:
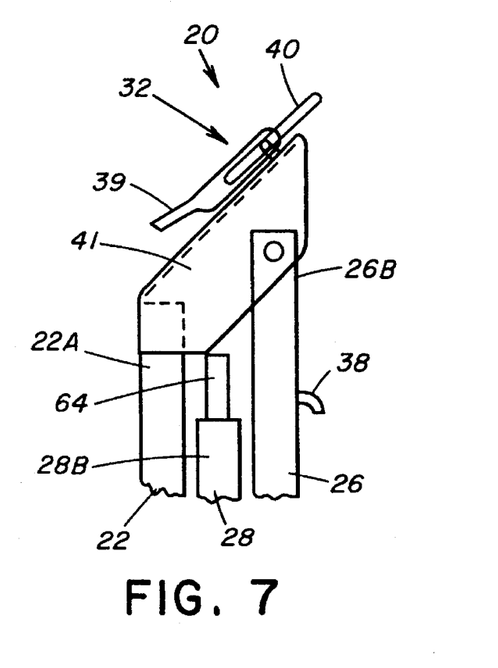
FIG. 7 is an enlarged detailed view of the area of the device enclosed by circle 7 of FIG. 1.
Figure 8:
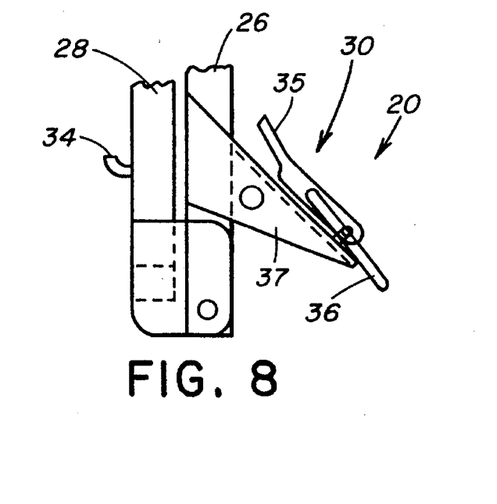
FIG. 8 is an enlarged detailed view of the area of the device enclosed by circle 8 of FIG. 1.
Figure 9:
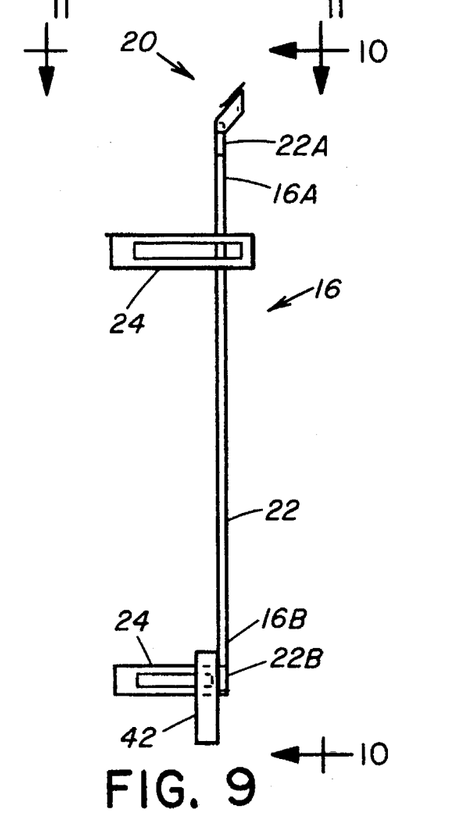
FIG. 9 is an enlarged side elevational view of the lower base portion of the support frame.
Figure 10:
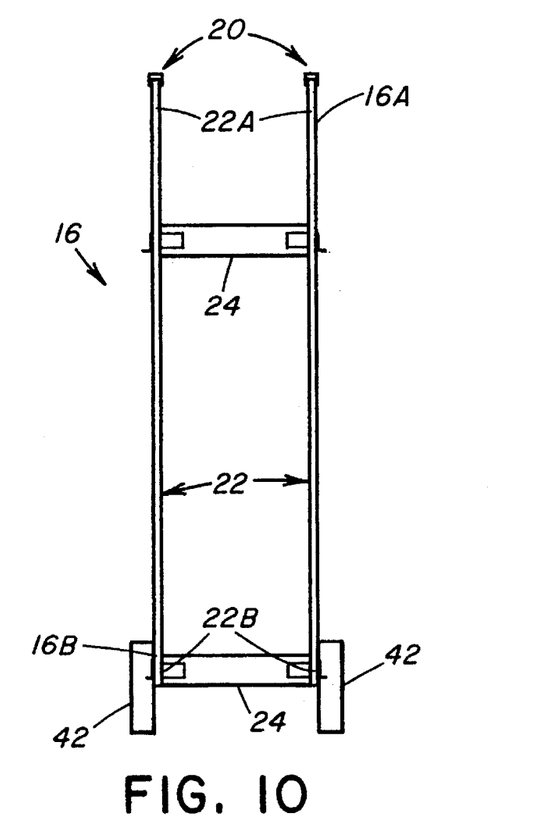
FIG. 10 is an enlarged rear elevational view of the lower base portion as seen along line 10—10 of FIG. 9.
Figure 11:
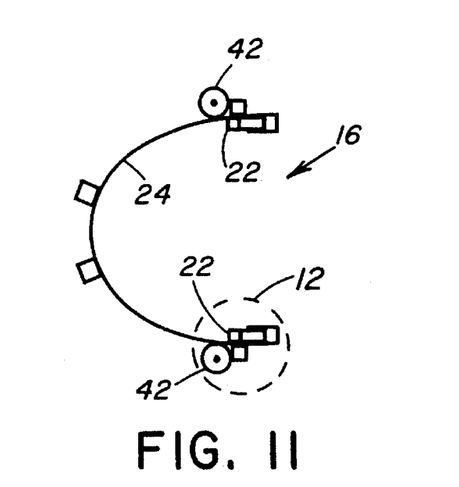
FIG. 11 is an enlarged top plan view of the lower base portion as seen along line 11—11 of FIG. 9.
Figure 12:
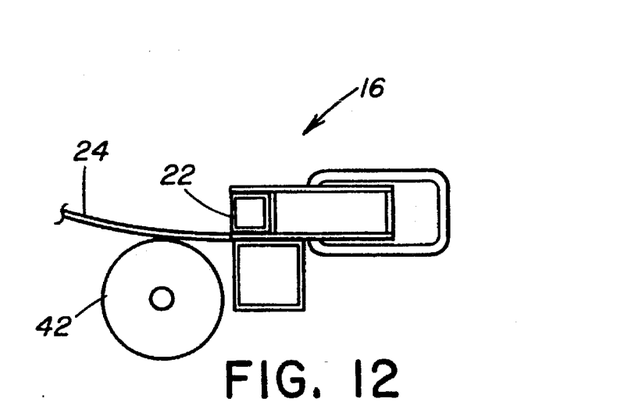
FIG. 12 is an enlarged detailed view of the area of the lower base portion enclosed by circle 12 of FIG. 11.
Figure 13:
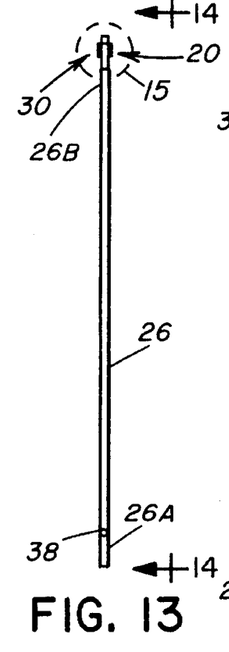
FIG. 13 is an enlarged rear elevational view of one of the longitudinal lower frame extension members of the upper extension portion.
Figures 14, 17:
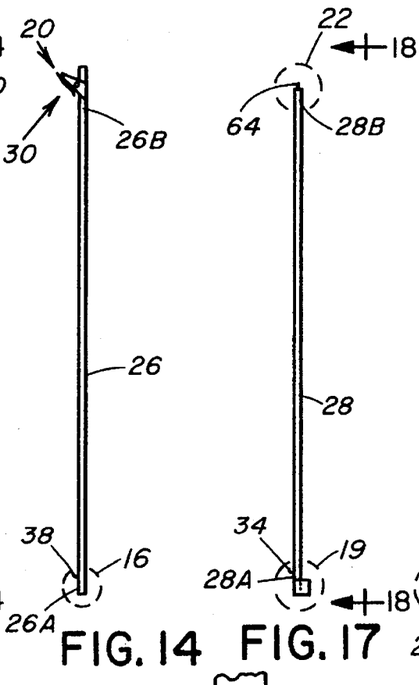
FIG. 14 is an enlarged side elevational view of the longitudinal lower frame extension member as seen along line 14—14 of FIG. 13.
FIG. 17 is an enlarged side elevational view of the longitudinal upper frame extension members of the upper extension portion.
Figure 15:
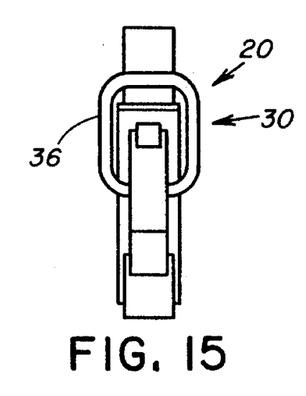
FIG. 15 is an enlarged detailed view of the area of the longitudinal lower frame extension member enclosed by circle 15 of FIG. 13.
Figure 16:
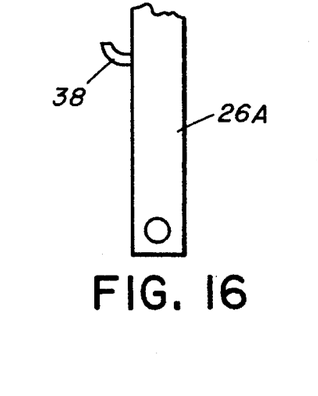
FIG. 16 is an enlarged detailed view of the area of the longitudinal lower frame extension member enclosed by circle 16 of FIG. 14.
Figure 18:
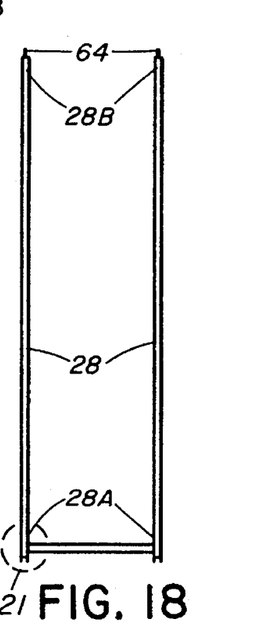
FIG. 18 is an enlarged front elevational view of the longitudinal upper frame extension members as seen along line 18—18 of FIG. 17.
Figure 19:
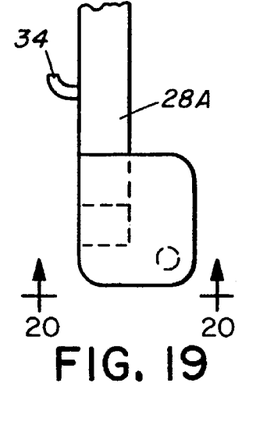
FIG. 19 is an enlarged detailed view of the area of one of the longitudinal upper frame extension members enclosed by circle 19 of FIG. 17.
Figure 20:
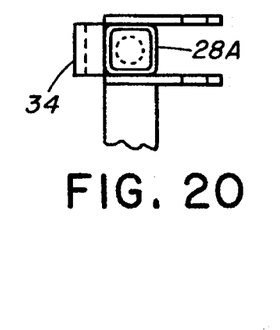
FIG. 20 is an enlarged bottom plan view of the longitudinal upper frame extension member as seen along line 20—20 of FIG. 19.
Figure 21:
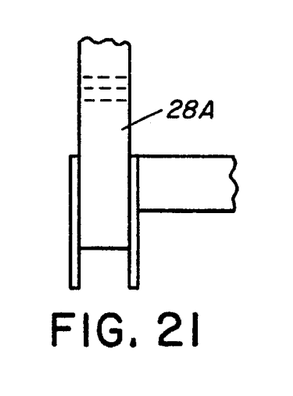
FIG. 21 is an enlarged detailed view of the area of the longitudinal upper frame extension member enclosed by circle 21 of FIG. 18.
Figure 22:
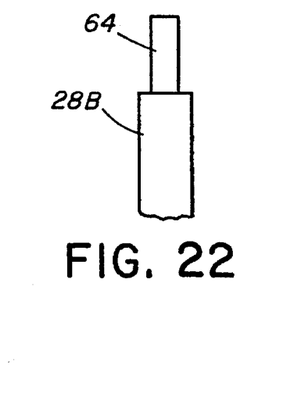
FIG. 22 is an enlarged detailed view of the area of the longitudinal upper frame extension member enclosed by circle 22 of FIG. 17.

Referring to the drawings and particularly to FIGS. 1 to 3, there is illustrated a golf cart sun shade and inclement weather protection device, generally designated 10, of the present invention. Basically, the device 10 includes a support frame 12 adapted for attachment to a golf bag and cart G, as shown in phantom outline in FIGS. 1 and 2, and and an elongated shade 14 adapted for attachment to the support frame 12. The support frame 12 is convertible between a retracted position, as shown in FIG. 2, in which the support frame 12 is disposed alongside the golf bag and cart G, and an extended position, as shown in FIG. 1, wherein portions of the support frame 12 generally extend thereabove. The elongated shade 14 is convertible between a collapsed condition (not shown) in which the shade 14 is merely rolled up starting at one end and progressing to the opposite end, and a deployed condition, as seen in FIGS. 1 and 3. The shade 14 is converted to the collapsed condition by detaching and removing it from the support frame 12 whereas it is converted to the deployed condition by attaching it to the support frame 12 so as to overlie the support frame 12 being in the extended position.

Referring to FIGS. 1, 2 and 7–12, the support frame 12 of the device 10 more particularly includes a lower base portion 16, an upper extension portion 18 mounted to the lower base portion 16 for undergoing pivotal movement between the retracted and extended positions relative thereto, and means 20 for releasably securing the upper extension portion 18 in the extended position relative to the lower base portion 16. The lower base portion 16 has a pair of longitudinal lower frame members 22 and a pair of arcuate-shaped cross members 24 spaced apart from one another along the lower frame members 22 and rigidly interconnecting the lower frame members 22 and adapted to receive the golf bag and to be attached by any suitable means, such as straps S, to the golf cart G. The upper extension portion 18 has a pair of longitudinal lower frame extension members 26 and a pair of longitudinal upper frame extension members 28 connected to one another for undergoing pivotal movement between a substantially unfolded position, as seen in FIG. 1, and a substantially folded position, as seen in FIG. 2. As one example, the support frame 12 can be made substantially of a rigid material, preferably one-half inch aluminum tubing, with the lower frame members 22 of the lower base portion 16 and the lower and upper frame extension members 26, 28 of the upper extension portion 18 being substantially cylindrical or square in shape in cross-section and each also being substantially similar in length.

The upper extension portion 18 is mounted at lower ends 26A of the lower frame extension members 26 to upper ends 22A of the lower frame members 22 of the lower base portion 16 for pivotal movement between the retracted position of the support frame 12 in which the lower and upper frame extension members 26, 28 lie in the substantially folded position relative to one another alongside the lower base portion 16, and the extended position of the support frame 12 in which the lower and upper frame extension members 26, 28 of the upper extension portion 18 extend away from one another into the substantially unfolded position away from the lower base portion 16.

Referring now to FIGS. 1, 2, 5–10, and 13–19, the means 20 for releasably securing the upper extension portion 18 in the substantially unfolded position and for releasably securing the support frame 12 in the extended position includes an upper pair of releasable latches 30 and a lower pair of releasable latches 32. The upper pair of latches 30 are located at the pivotal connection between the upper ends 26B of the lower frame extension members 26 and the lower ends 28A of the upper frame extension members 28 of the upper extension portion 18 of the support frame 12. The lower pair of latches 32 are located at the pivotal connection between the lower ends 26A of the lower frame extension members 26 of the upper extension portion 18 and the upper ends 22A of the lower frame members 22 of the lower base portion 16 of the support frame 12.

By way of example, each upper releasable latch 30 may include a hook element 34 fixedly mounted to a respective one lower end 28A of upper frame extension members 28 and a link element 36 pivotally mounted via an overcentering lever 35 to an upper bracket 37 fixedly attached to and extending inclined upwardly from a respective one upper end 26B of lower frame extension members 26. By pivotally manipulating the respective overcentering levers 35, each link element 36 can be moved into engagement with the respective adjacent hook element 34 so to hold the upper extension portion 18 in the unfolded position and further can be disengaged and removed from the respective adjacent hook element 36 to release the upper extension portion 18 from the unfolded position so that it can be moved to the folded position.

Also, by way of example, each lower releasable latch 32 may include a hook element 38 fixedly mounted to a respective one lower end 26A of lower frame extension members 26 and a link element 40 pivotally mounted via an overcentering lever 39 to a lower bracket 41 fixedly attached to and extending inclined upwardly from a respective one upper end 22A of lower frame members 22 of the lower base portion 16. By pivotally manipulating the respective overcentering levers 39, each link element 40 can be moved into engagement into engagement with the respective adjacent one hook element 38 so as to hold the upper extension portion 18 in the extended position relative to the lower base portion 16 and further can be disengaged and removed from the respective adjacent hook element 38 to release the upper extension portion 18 from the extended position so that it can be moved to the retracted position relative to the lower base portion 16. Latches 30, 32 may have other suitable configurations known to one of ordinary skill in the art.

Referring now to FIGS. 1 and 2, 9 to 12, the support frame 12 further includes a pair of cylindrical receptacles 42. Each receptacle is attached adjacent to a lower end 22B of each one of the lower frame members 22 of the lower base portion 16 in substantially parallel relation thereto for receiving and retaining therein an end of the elongated shade 14 in the rolled up or wrapped condition for storage thereof.

Referring again to FIGS. 1 and 2, the elongated shade 14 of the device 10 more particularly includes a main cover 44 having an upper portion 46 and a lower portion 48 releasably attachable at a lower end 48A to the upper end 16A of the lower base portion 16 of the support frame 12 when the shade 14 is in the deployed condition and the support frame 12 is in the extended position. The shade 14 also includes a pair of opposite side covers 50 attached to and extending along at least adjacent extents of opposite sides of the upper and lower portions 46, 48 of the main cover 44 with the main cover 44 and the opposite side covers 46, 48 adapted for overlying the support frame 12 with the shade 14 in the deployed condition and the support frame 12 in the extended position.

The shade 14 further includes a pair of generally transverse upper and lower rods 52, 54. The upper rod 52 is attached to and extends along the main cover 44 at the upper end 46A of the upper portion 46 of the shade 14 between opposite sides thereof. The lower rod 54 is releasably seated on the main cover 44 on the upper extension portion 18 at the location of merger between the upper and lower portions 46, 48 of the main cover 44 with the shade 14 disposed in the deployed condition and the upper extension portion 18 in the extended position. The lower rod 54 extends in a substantially parallel relationship to the upper rod 52.

Furthermore, referring to FIG. 3, the main cover 44 of the shade 14 has a longitudinally-extending length L substantially greater than a transverse width W. The width W of the main cover 44 is substantially greater at the upper end 46A of the upper portion 46 than at the lower end 48A of the lower portion 48. The main cover 44 further has a peripheral edge 44A which tapers along the opposite sides of the upper and lower portions 46, 48 from the upper end 46A of the upper portion 46 to the lower end 48A of the lower portion 48, as shown in FIG. 3 where the shade 14 is shown in a plan layout position. The main and opposite side covers 44, 50 of the shade 14 are preferably made substantially of a flexible opaque waterproof material. The transverse upper and lower rods 52, 54 of the shade 14 are made substantially of a rigid material and are also generally cylindrical in shape.

Referring now to FIG. 3, the lower portion 48 of the main cover 44 of the shade 14 has a pair of tie straps 56 extending in substantially parallel relation to one another from the lower end 48A of the lower portion 48 of the main cover 44 for pulling the shade 14 tight, for attaching the shade 14 to the upper end 16A of the lower base portion 16 of the support frame 12 and for tying off the shade 14 in a rolled or wrapped condition for storage thereof. Furthermore, the lower portion 48 of the main cover 44 of the shade 14 may have an extension portion 58 attached to and extending from the lower end 48A of the lower portion 48 along the longitudinal length of the lower base portion 16 of the support frame 12 for overlying the golf club bag and cart G setting within the support frame 12 and being removably attachable to a lower end 16B of the lower base portion 16 of the support frame 12. The extension portion 58 of the lower portion 48 of the main cover 44 of the shade 14 may also have a pair of tie straps 60 extending in substantially parallel relation to one another from a lower end 58A of the extension portion 58 for pulling the shade 14 tight, for attaching the shade 14 to the lower end 16B of the lower base portion 16 of the support frame 12 and for tying off the shade 14 in a wrapped condition for storage thereof.

Referring now to FIGS. 1, 3, 4, 17, 18 and 22, the upper transverse rod 52 of the shade 14 also has a pair of holes 62 therein for removably receiving the upper ends 28B of the pair of upper frame extension members 28 of the upper extension portion 18 of the support frame 12. Each upper end 28B particularly has an upper tip portion 64 substantially cylindrical in shape with a diameter substantially less in size than a diameter of the upper frame extension member 28. Each of the pair of holes 62 of the upper transverse rod 52 is circular in shape and has a diameter slightly greater in size than the diameter of the upper tip portion 64 for releasably receiving the upper tip portion 64 therein when the support frame 12 is in the extended position and the shade 14 is in the deployed condition.

Referring again to FIG. 3, the device 10 further includes an air flow passage 66 defined in the main cover 44 of the shade 14 for permitting air to pass through the shade 14. The air flow passage 66 includes an upper slot 68 defined in the lower portion 48 of the main cover 44 adjacent to the location of merger between the upper and lower portions 46, 48 of the main cover 44 and extending between and terminating at opposite ends spaced inwardly from the opposite sides of the lower portion 48 of the main cover 44, and a lower slot 70 defined in the lower portion 48 of the main cover 44 substantially midway between an upper end 48B and the lower end 48A of the lower portion 48 and extending between and terminating at opposite ends spaced inwardly from the opposite sides of the lower portion 48 of the main cover 44.

The device 10 also includes a light blocking means 72 on the main cover 44 of the shade 14 adjacent to each of the upper and lower slots 68, 70 in the lower portion 48 of the main cover 44 of the shade 14 for blocking the transmission of light through the upper and lower slots 68, 70 without preventing the flow of air therethrough. The light blocking means 72 particularly includes an upper flap 74 attached to the lower portion 48 of the main cover 44 above and along the upper slot 68. The upper flat 74 extends along and overlies the upper slot 68 but is spaced outwardly from the upper slot 68 so as to provide sufficient clearance between the upper slot 68 and the upper flap 74 to permit the flow of air past the upper flap 74 and through the upper slot 68. The light blocking means 72 also includes a lower flap 76 attached to the lower portion 48 of the main cover 44 above and along the lower slot 70. The lower flap 76 extends along and overlies the lower slot 70 but is spaced outwardly from the lower slot 70 so as to provide sufficient clearance between the lower slot 70 and the lower flap 76 to permit the flow of air past the lower flap 74 and through the lower slot 70. The upper and lower flaps 74, 76 are preferably made of a suitable flexible opaque waterproof material.

The device 10 additionally includes a window 78 defined in the lower portion 48 of the main cover 44 of the shade 14 by a continuous interior edge 80 forming an opening 82 therethrough spaced from the opposite sides of the lower portion 48 and between the upper and lower slots 68, 70. The window 78 also includes a sheet 84 made substantially of a suitable flexible transparent material attached to the continuous interior edge 80 in the lower portion 48 of the main cover 44 so as to overlie and close the opening 82.

Finally, referring now to FIGS. 1 and 3, the steps in the assembly of the device 10 are, as mentioned above, simple and efficient and can be done in about one minute. The support frame 12 is first secured to the golf bag by straps S and then both the support frame 12 and golf bag are placed in the golf cart G and secured thereto by pull cart straps. The shade 14 stored in the wrapped condition in the receptacle 42 attached to the support frame 12 is easily removed therefrom. The upper tie straps 56 are released to unwrap the shade 14 for erection from the collapsed condition to the deployed condition.

The upper end 46A of the upper portion 46 of the main cover 44 is then attached to the upper ends 28A of the upper frame extension members 28 of the upper extension portion 18 of the support frame 12 while the support frame 12 is in the process of being moved from the retracted position to the extended position. The link elements 36, 40 of the upper and lower pairs of releasable latches 30, 32 are then placed in the engaged position with the hook elements 34, 38 thereof to secure the support frame 12 in the extended position. The tie straps 86 of the shade 14 are then used to pull the shade 14 tight over the support frame 12 with the holes 62 in the upper rod 52 of the shade 14 receiving therethrough the upper tip portions 64 of the upper ends 28A of the upper frame extension members 28 and the lower rod 54 of the shade 14 seated upon the upper extension portion 18 of the support frame 12 just above the upper ends 26A of the lower frame extension members 26. The tie straps 56 are then fastened to the lower base portion 16 of the support frame 12 to secure the shade 14 in the deployed condition. If the extension portion 58 of the shade 14 is also to be deployed, then the lower tie straps 60 are untied, the extension portion 58 is rolled out and the lower tie straps 60 are then fastened to the lower base portion 16 of the support frame 12 to secure the extension portion 58 in the deployed position.

In summary, the device 10 provides a comprehensive solution for protection of the golfer and the top of the golf club bag from the sun and inclement weather on the golf course. The device 10 is usable with most existing golf carts, is simple and efficient to set up and is compact in that it forms a single unit with the golf cart and the golf club bag.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

I claim:

1. A golf cart sun shade and inclement weather protection device, comprising:
   (a) a support frame adapted for attachment to a golf cart and being convertible between a retracted position and an extended position, said support frame including
      (i) a lower base portion adapted for attachment to the golf cart, said lower base portion having a pair of longitudinal lower frame members and a pair of arcuate-shaped cross members spaced apart from one another along said lower frame members and rigidly interconnecting said lower frame members for receiving a golf bag therebetween and being attachable to the golf cart,
      (ii) an upper extension portion mounted at a lower end to an upper end of said lower base portion for pivotal movement between said retracted and extended positions, and
      (iii) means for releasably securing said upper extension portion in said extended position: relative to said lower base member; and
   (b) an elongated shade adapted for removable attachment to said support frame and being convertible between a collapsed condition and a deployed condition, said shade in said collapsed condition being unattached and removed from said support frame and in said deployed condition being releasably attachable to and overlying said support frame with said support frame disposed in said extended position.

2. The device of claim 1 wherein said upper extension portion includes:
   a pair of longitudinal lower frame extension members;
   a pair of longitudinal upper frame extension members pivotally connected to said pair of lower frame extension members, said lower and upper frame extension members lying in a substantially folded position relative to one another when said support frame is at said retracted position, said lower and upper frame extension members extending away from one another into a substantially unfolded position when said support frame is at said extended position; and means for releasably securing said upper frame extension member in said unfolded position relative to said lower frame extension member.

3. The device of claim 2 wherein said lower frame extension members at lower ends are mounted to an upper end of said lower base portion for pivotal movement between said retracted position in which said lower and upper frame extension members lie in said folded position relative to one another alongside said lower base portion and said extended position in which said lower and upper frame extension members extend away from one another into said unfolded position away from said lower base portion.

4. A golf cart sun shade and inclement weather protection device, comprising:
   (a) a support frame adapted for attachment to a golf cart and being convertible between a retracted position and an extended position, said support frame including
      (i) a lower base portion adapted for attachment to the golf cart,
      (ii) an upper extension portion mounted at a lower end to an upper end of said lower base portion for pivotal movement between said retracted and extended positions., said upper extension portion including a pair of longitudinal lower frame extension members, a pair of longitudinal upper frame extension members pivotally connected to said pair of lower frame extension members, said lower and upper frame extension members lying in a substantially folded position relative to one another when said support frame is at said retracted position, said lower and upper frame extension members extending away from one another into a substantially unfolded position when said support frame is at said extended position, and means for releasably securing said upper frame extension members in said unfolded position relative to said lower frame extension members, and
      (iii) means for releasably securing said upper extension portion in said extended position relative to said lower base member; and
   (b) an elongated shade adapted for removable attachment to said support frame and being convertible between a collapsed condition and a deployed condition, said shade in said collapsed condition being unattached and removed from said support frame and in said deployed condition being releasably attachable to and overlying said support frame with said support frame disposed in said extended position.

5. The device of claim 4 wherein said shade includes an upper transverse rod having a pair of holes therein for removably receiving upper ends of said upper frame extension members of said upper extension portion of said support frame.

6. A golf cart sun shade and inclement weather protection device, comprising:
   (a) a support frame adapted for attachment to a golf cart and being convertible between a retracted position and an extended position, said support frame including
      (i) a lower base portion adapted for attachment to the golf cart,
      (ii) an upper extension portion mounted at a lower end to an upper end of said lower base portion for pivotal movement between said retracted and extended positions, and
      (iii) means for releasably securing said upper extension portion in said extended position relative to said lower base member;

(b) an elongated shade adapted for removable attachment to said support frame and being convertible between a collapsed condition and a deployed condition, said shade in said collapsed condition being unattached and removed from said support frame and in said deployed condition being releasably attachable to and overlying said support frame with said support frame disposed in said extended position; and
   (c) a substantially cylindrical receptacle attached to a lower side of said lower base portion in substantially parallel relation thereto for receiving and retaining therein an end of said shade in a wrapped condition for storage thereof.

7. A golf cart sun shade and inclement weather protection device, comprising:
   (a) a support frame adapted for attachment to a golf cart and being convertible between a retracted position and an extended position, said support frame including
      (i) a lower base portion adapted for attachment to the golf cart,
      (ii) an upper extension portion mounted at a lower end to an upper end of said lower base portion for pivotal movement between said retracted and extended positions, and
      (iii) means for releasably securing said upper extension portion in said extended position relative to said lower base member; and
   (b) an elongated shade adapted for removable attachment to said support frame and being convertible between a collapsed condition and a deployed condition, said shade in said collapsed condition being unattached and removed from said support frame and in said deployed condition being releasably attachable to and overlying said support frame with said support frame disposed in said extended position, said shade including
      (i) a main cover having an upper portion and a lower portion releasably attachable at a lower end to said upper end of said lower base portion of said support frame when said shade is in said deployed condition and said support frame is in said extended position, and
      (ii) means for releasably attaching said main cover at an upper end of said upper portion thereof to an upper end of said upper extension portion of said support frame with said shade in said deployed condition and said upper extension portion in said extended position.

8. The device of claim 7 wherein said releasably attaching means is a substantially transverse upper rod attached to and extending along said main cover at said upper end of said upper portion thereof between opposite sides thereof.

9. The device of claim 7 wherein said shade further includes means for releasably seating said main cover on said upper extension portion at a location of merger between said upper and lower portions of said main cover with said shade in said deployed condition and said upper extension portion in said extended position.

10. The device of claim 9 wherein said releasably seating means is a substantially transverse lower rod extending in a substantially parallel relationship to said upper rod and being attached to and extending along said main cover of said shade at said location of merger between said upper and lower portions thereof and between said opposite sides thereof.

11. The device of claim 7 wherein said shade further includes a pair of opposite side covers attached to and extending along at least adjacent extents of opposite sides of said upper and lower portions of said main cover such that said main cover and said opposite side covers overlie said support frame with said shade in said deployed condition and said support frame in said extended position.

12. The device of claim 7 further comprising:
   (c) means defining an air flow passage in said main cover of said shade for permitting air to pass through said shade, said air flow passage means including
      (i) means defining an upper slot in said lower portion of said main cover adjacent to said location of merger between said lower and upper portions of said main cover, said upper slot extending between and terminating at opposite ends thereof spaced from said opposite sides of said lower portion of said main cover, and
      (ii) means defining a lower slot in said lower portion of said main cover substantially midway between said upper end and said lower end of said lower portion, said lower slot extending between and terminating at opposite ends thereof spaced from said. opposite sides of said lower portion of said main cover.

13. The device of claim 12 further comprising:
   (d) means on said main cover of said shade adjacent to each of said upper and lower slots in said lower portion of said main cover for blocking the transmission of light through said upper and lower slots without preventing flow of air therethrough, said light blocking means including
      (i) an upper flap attached to said lower portion of said main cover along said upper slot, said upper flap extending along and overlying said upper slot and being spaced outwardly therefrom so as to provide sufficient clearance between said upper slot and said upper flap to permit flow of air past said upper flap and through said upper slot, and
      (ii) a lower flap attached to said lower portion of said main cover along said lower slot, said lower flap extending along and overlying said lower slot and being spaced outwardly therefrom so as to provide sufficient clearance between said lower slot and said lower flap to permit flow of air past said lower flap and through said lower slot.

14. The device of claim 7 further comprising:
   (c) means defining a window in said lower portion of said main cover of said shade, said means defining a window including
      (i) a continuous interior edge defined in said lower portion of said main cover forming an opening therethrough spaced from said opposite sides of said lower portion and between said upper and lower slots of said air flow passage means, and
      (ii) a sheet made substantially of a flexible transparent material attached to said continuous interior edge in said lower portion of said main cover so as to overlie and close said opening.

15. The device of claim 7 wherein said lower portion of said main cover of said shade has a pair of tie straps extending in substantially parallel relation to one another from said lower end of said lower portion of said main cover for pulling said shade tight, for attaching said shade to said upper end of said lower base portion of said support frame and for tying off said shade in a wrapped condition for storage thereof.

16. The device of claim 7 wherein said lower portion of said main cover of said shade has an extension portion extending out from said lower end of said lower portion along the longitudinal length of said lower base portion of said support frame for overlying the golf bag setting within said support frame and being removably attachable to a lower end of said lower base portion of said support frame.

17. The device of claim 16 wherein said extension portion of said lower portion of said main cover of said shade has a pair of tie straps extending in substantially parallel relation to one another from a lower end of said extension portion for pulling said shade tight, for attaching said shade to said lower end of said lower base portion of said support frame and for tying off said shade in a wrapped condition for storage thereof.

18. A golf cart sun shade and inclement weather protection device, comprising:
   (a) a support frame adapted for attachment to a golf cart and being convertible between a retracted position and an extended position, said support frame including
      (i) a lower base portion having a pair of longitudinal lower frame members and a pair of arcuate-shaped cross members spaced apart from one another and rigidly interconnecting said longitudinal lower frame members for receiving a golf bag therebetween and being releasably attachable to the golf cart,
      (ii) an upper extension portion having a pair of longitudinal lower frame extension members and a pair of longitudinal upper frame extension members pivotally connected to said lower frame extension members, said upper extension portion mounted at lower ends of said lower frame extension members to an upper end of said lower base portion for undergoing pivotal movement between said retracted position in which said lower and upper frame extension members lie in a substantially folded position relative to one another alongside said lower base portion and said extended position in which said lower and upper frame extension members of said upper extension portion extend away from one another into a substantially unfolded position away from said lower base portion, and
      (iii) means for releasably securing said upper extension portion in said substantially unfolded position relative to said lower base portion and thereby for releasably securing said support frame in said extended position; and
   (b) an elongated shade adapted for attachment to said support frame and being convertible between a collapsed condition and a deployed condition, said shade in said collapsed condition being unattached and removed from said support frame and in said deployed condition being releasably attachable to and overlying said support frame with said support frame in said extended position, said shade including
      (i) a main cover having an upper portion and a lower portion, said lower portion of said main cover of said shade in said deployed condition being releasably attachable at a lower end to said upper end of said lower base portion of said support frame with said support frame in said extended position, and
      (ii) a pair of substantially transverse upper and lower rods, said upper rod being attached to and extending along said main cover at an upper end of said upper portion thereof between opposite sides thereof with said shade in said deployed condition and being releasably attachable to upper ends of said pair of upper frame extension members of said upper extension portion of said support frame with said support frame in said extended position, said lower rod disposed in substantially parallel relationship to said upper rod and being attached to and extending along said main cover of said shade at a location of merger between said upper and lower portions thereof and between said opposite sides thereof with said shade in said deployed condition and being seatable on said upper extension portion of said support frame with said support frame in said extended position.

19. The device of claim 18 wherein said shade further includes a pair of opposite side covers attached to and extending along at least adjacent extents of said opposite sides of said upper and lower portions, said main cover and said pair of opposite side covers of said shade in said deployed condition adapted to overlie said support frame with said support frame in said extended position.

20. The device of claim 18 wherein said main and side covers of said shade are made substantially of a flexible opaque waterproof material.

21. The device of claim 18 wherein said means for releasably securing said upper extension portion in said substantially unfolded position relative to said lower base portion and thereby for releasably securing said support frame in said extended position includes:

an upper pair of releasable latches located at the pivotal connection between said lower and upper frame extension members of said upper extension portion of said support frame; and a lower pair of releasable latches located at the pivotal connection between said lower ends of said lower frame extension members of said upper extension portion and said upper end of said lower base portion of said support frame, said latches being disposable in an engaged condition to maintain said upper and lower frame extension members in said unfolded position and said upper extension portion in said extended position relative to said lower base portion, said latches being movable to a disengaged condition to permit pivotal movement of said upper frame extension members and said lower frame extension members to said unfolded position and said upper extension portion relative to said lower base portion to said retracted position.

22. The device of claim 21 wherein said upper pair of releasable latches includes:

respective hook elements fixedly mounted to lower ends of said upper frame extension members of said upper extension portion; and respective link elements movably mounted to upper ends of said lower frame extension members of said upper extension portion;

each of said link elements being engageable with an adjacent one of said hook elements to hold said upper extension portion in said unfolded position and further is disengageable from said adjacent hook element to release said upper extension portion from said unfolded position to allow movement to said folded position.

23. The device of claim 21 wherein said lower pair of releasable latches includes:

respective hook elements mounted to lower ends of said lower frame extension members of said upper extension portion; and respective link elements movably mounted to said upper end of said lower base portion;

each of said link elements is engageable with an adjacent one of said hook elements to hold said upper extension portion in said extended position relative to said lower base portion and further is disengageable from said adjacent hook element to release said upper extension portion from said extended position to said retracted position relative to said lower base portion.

\* \* \* \* \*